US010800885B2

(12) United States Patent
Fiedel et al.

(10) Patent No.: US 10,800,885 B2
(45) Date of Patent: Oct. 13, 2020

(54) CURABLE COMPOSITION BASED ON POLYSILOXANES

(71) Applicant: Evonik Operations GmbH, Essen (DE)

(72) Inventors: Michael Fiedel, Essen (DE); Thorsten Marochow, Essen (DE); Doreen Engel, Krumbach (DE); Frank Schubert, Neukirchen-Vluym (DE); Anke Lewin, Düsseldorf (DE)

(73) Assignee: Evonik Operations GmbH, Essen (DE)

( * ) Notice: Subject to any disclaimer, the term of this patent is extended or adjusted under 35 U.S.C. 154(b) by 156 days.

(21) Appl. No.: 16/143,543

(22) Filed: Sep. 27, 2018

(65) Prior Publication Data
US 2019/0092904 A1 Mar. 28, 2019

(30) Foreign Application Priority Data

Sep. 28, 2017 (EP) ..................................... 17193627

(51) Int. Cl.
| | | |
|---|---|---|
| C08L 83/04 | (2006.01) |
| C08G 77/04 | (2006.01) |
| C09D 5/16 | (2006.01) |
| C08G 65/333 | (2006.01) |
| C08G 65/336 | (2006.01) |
| C08G 18/24 | (2006.01) |
| C08G 18/28 | (2006.01) |
| C09D 183/04 | (2006.01) |
| C08G 18/75 | (2006.01) |
| C09D 171/02 | (2006.01) |
| C08G 18/50 | (2006.01) |
| C09D 175/08 | (2006.01) |
| C08G 77/14 | (2006.01) |
| C08G 77/18 | (2006.01) |

(52) U.S. Cl.
CPC ........... *C08G 77/04* (2013.01); *C08G 18/246* (2013.01); *C08G 18/283* (2013.01); *C08G 18/5096* (2013.01); *C08G 18/755* (2013.01); *C08G 65/336* (2013.01); *C08G 65/33348* (2013.01); *C09D 5/1637* (2013.01); *C09D 5/1675* (2013.01); *C09D 171/02* (2013.01); *C09D 175/08* (2013.01); *C09D 183/04* (2013.01); *C08G 77/14* (2013.01); *C08G 77/18* (2013.01)

(58) Field of Classification Search
None
See application file for complete search history.

(56) References Cited

U.S. PATENT DOCUMENTS

| | | | |
|---|---|---|---|
| 6,884,852 B1 | 4/2005 | Klauck et al. |
| 8,158,572 B2 | 4/2012 | Schubert et al. |
| 8,247,525 B2 | 8/2012 | Schubert et al. |
| 8,268,939 B2 | 9/2012 | Ebbrecht et al. |
| 8,283,422 B2 | 10/2012 | Schubert et al. |
| 8,309,664 B2 | 11/2012 | Knott et al. |
| 8,309,673 B2 | 11/2012 | Schubert et al. |
| 8,324,325 B2 | 12/2012 | Knott et al. |
| 8,334,355 B2 | 12/2012 | Henning et al. |
| 8,450,514 B2 | 5/2013 | Schubert et al. |
| 8,729,207 B2 | 5/2014 | Hartung et al. |
| 8,772,423 B2 | 7/2014 | de Gans et al. |
| 8,779,079 B2 | 7/2014 | Henning et al. |
| 8,802,744 B2 | 8/2014 | Knott et al. |
| 8,883,932 B2 | 11/2014 | Brugger et al. |
| 8,957,009 B2 | 2/2015 | Schubert et al. |
| 8,974,627 B2 | 3/2015 | Schubert et al. |
| 8,993,706 B2 | 3/2015 | Schubert et al. |
| 9,035,011 B2 | 5/2015 | Ferenz et al. |
| 9,051,424 B2 | 6/2015 | Lobert et al. |
| 9,068,044 B2 | 6/2015 | Schubert et al. |
| 9,115,335 B2 | 8/2015 | Trosin et al. |
| 9,175,126 B2 | 11/2015 | Albrecht et al. |
| 9,315,614 B2 | 4/2016 | Schubert et al. |
| 9,334,354 B2 | 5/2016 | Ferenz et al. |
| 9,346,919 B2 | 5/2016 | Jazkewitsch et al. |
| 9,441,145 B2 | 9/2016 | Schubert et al. |
| 9,481,695 B2 | 11/2016 | Knott et al. |
| 9,550,928 B2 | 1/2017 | Lobert et al. |
| 9,783,635 B2 | 10/2017 | Schubert et al. |
| 9,790,327 B2 | 10/2017 | Klotzbach et al. |
| 9,896,534 B2 | 2/2018 | Lobert et al. |

(Continued)

FOREIGN PATENT DOCUMENTS

| | | |
|---|---|---|
| DE | 34 12 648 | 10/1985 |
| DE | 10 2010 001 588 | 8/2011 |

(Continued)

OTHER PUBLICATIONS

Extended European Search Report dated Mar. 8, 2018 in European Application 17193627.1.
Search Report issued in EP Application 18193954.7 dated Feb. 19, 2019.
U.S. Pat. No. 8,158,572, Apr. 17, 2012, 2011/0190190, Schubert et al.
U.S. Pat. No. 8,247,525, Aug. 21, 2012, 2011/0281973, Schubert et al.
U.S. Pat. No. 8,268,939, Sep. 18, 2012, 2010/0184913, Ebbrecht et al.

(Continued)

*Primary Examiner* — Robert S Loewe
(74) *Attorney, Agent, or Firm* — Grüneberg and Myers PLLC

(57) ABSTRACT

A curable composition can have a surface with amphiphilic properties which is thus able to counteract biofouling. The curable composition includes: a component A: at least one polysiloxane, a component B: at least one polyether bearing silyl groups and/or a reaction product of a polyether bearing silyl groups with one or more isocyanate-containing compounds, and a component C: at least one catalyst.

18 Claims, No Drawings

(56) References Cited

U.S. PATENT DOCUMENTS

| | | | |
|---|---|---|---|
| 9,896,541 | B2 | 2/2018 | Fiedel et al. |
| 9,975,909 | B2 | 5/2018 | Schubert et al. |
| 10,087,278 | B2 | 10/2018 | Lobert et al. |
| 10,106,649 | B2 | 10/2018 | Fiedel et al. |
| 2002/0115811 | A1 | 8/2002 | Huang et al. |
| 2007/0129528 | A1 | 6/2007 | Huang et al. |
| 2009/0137751 | A1 | 5/2009 | Knott et al. |
| 2009/0137752 | A1 | 5/2009 | Knott et al. |
| 2010/0041910 | A1 | 2/2010 | Schubert et al. |
| 2010/0081781 | A1 | 4/2010 | Schubert et al. |
| 2010/0105843 | A1 | 4/2010 | Knott et al. |
| 2010/0113633 | A1 | 5/2010 | Henning et al. |
| 2010/0168367 | A1 | 7/2010 | Schubert et al. |
| 2010/0184913 | A1 | 7/2010 | Ebbrecht et al. |
| 2010/0266518 | A1 | 10/2010 | Springer et al. |
| 2011/0021693 | A1 | 1/2011 | Henning et al. |
| 2011/0042004 | A1 | 2/2011 | Schubert et al. |
| 2011/0046305 | A1 | 2/2011 | Schubert et al. |
| 2011/0190190 | A1 | 8/2011 | Schubert et al. |
| 2011/0245412 | A1 | 10/2011 | Schubert et al. |
| 2011/0281973 | A1 | 11/2011 | Schubert et al. |
| 2012/0010302 | A1 | 1/2012 | Hartung et al. |
| 2012/0028022 | A1 | 2/2012 | Brugger et al. |
| 2012/0029090 | A1 | 2/2012 | Brugger et al. |
| 2012/0037036 | A1 | 2/2012 | Veit et al. |
| 2012/0067520 | A1 | 3/2012 | Schubert et al. |
| 2012/0068110 | A1 | 3/2012 | Schubert et al. |
| 2012/0071564 | A1 | 3/2012 | de Gans et al. |
| 2012/0190760 | A1 | 7/2012 | Henning et al. |
| 2012/0296125 | A1 | 11/2012 | Schubert et al. |
| 2012/0308494 | A1 | 12/2012 | Schubert et al. |
| 2012/0329942 | A1 | 12/2012 | Kohl et al. |
| 2013/0035408 | A1 | 2/2013 | Knott et al. |
| 2013/0041102 | A1 | 2/2013 | Albrecht et al. |
| 2013/0041115 | A1 | 2/2013 | Knott et al. |
| 2013/0213267 | A1 | 8/2013 | Fiedel et al. |
| 2013/0217930 | A1 | 8/2013 | Haensel et al. |
| 2013/0237616 | A1 | 9/2013 | Ferenz et al. |
| 2013/0245304 | A1 | 9/2013 | Schubert et al. |
| 2013/0345318 | A1 | 12/2013 | Schubert et al. |
| 2014/0057819 | A1 | 2/2014 | Haensel et al. |
| 2014/0179894 | A1 | 6/2014 | Lobert et al. |
| 2014/0256844 | A1 | 9/2014 | Henning et al. |
| 2014/0274863 | A1 | 9/2014 | Trosin et al. |
| 2014/0303065 | A1 | 10/2014 | Jazkewitsch et al. |
| 2015/0023900 | A1 | 1/2015 | Knott et al. |
| 2015/0031806 | A1 * | 1/2015 | Lim .................. C08L 75/04 524/114 |
| 2015/0057369 | A1 | 2/2015 | Ferenz et al. |
| 2015/0159068 | A1 | 6/2015 | Schubert et al. |
| 2015/0329752 | A1 | 11/2015 | Albrecht et al. |
| 2016/0053051 | A1 | 2/2016 | Schubert et al. |
| 2016/0053145 | A1 | 2/2016 | Lobert et al. |
| 2016/0130402 | A1 | 5/2016 | Schubert et al. |
| 2016/0160081 | A1 | 6/2016 | Klotzbach et al. |
| 2016/0208050 | A1 | 7/2016 | Klotzbach et al. |
| 2016/0311963 | A1 | 10/2016 | Lobert et al. |
| 2017/0009113 | A1 * | 1/2017 | Itano .................. C09J 11/04 |
| 2017/0081469 | A1 | 3/2017 | Fiedel et al. |
| 2017/0088667 | A1 | 3/2017 | Fiedel et al. |
| 2017/0226285 | A1 | 8/2017 | Lobert et al. |
| 2018/0010007 | A1 | 1/2018 | Roland et al. |
| 2018/0016392 | A1 | 1/2018 | Lobert et al. |
| 2018/0030274 | A1 | 2/2018 | Scheim et al. |
| 2018/0194682 | A1 | 7/2018 | Schubert et al. |
| 2018/0201795 | A1 | 7/2018 | Hed et al. |
| 2018/0305596 | A1 | 10/2018 | Schubert et al. |

FOREIGN PATENT DOCUMENTS

| | | | | |
|---|---|---|---|---|
| DE | 10 2015 202 278 | | 8/2016 | |
| EP | 1 093 482 | | 4/2001 | |
| EP | 1 946 740 | | 7/2008 | |
| EP | 2 093 244 | | 8/2009 | |
| EP | 2 289 961 | | 3/2011 | |
| EP | 2 289 972 | | 3/2011 | |
| EP | 2 636 696 | | 9/2013 | |
| WO | 2005/100482 | | 10/2005 | |
| WO | WO 2015111577 | * | 7/2015 | ............ C08L 101/10 |
| WO | 2017/137281 | | 8/2017 | |

OTHER PUBLICATIONS

U.S. Pat. No. 8,283,422, Oct. 9, 2012, 2011/0245412, Schubert et al.
U.S. Pat. No. 8,309,664, Nov. 13, 2012, 2010/0105843, Knott et al.
U.S. Pat. No. 8,309,673, Nov. 13, 2012, 2010/0168367, Schubert et al.
U.S. Pat. No. 8,324,325, Dec. 4, 2012, 2009/0137751, Knott et al.
U.S. Pat. No. 8,334,355, Dec. 18, 2012, 2010/0113633, Henning et al.
U.S. Pat. No. 8,450,514, May 28, 2013, 2010/0041910, Schubert et al.
U.S. Pat. No. 8,729,207, May 20, 2014, 2012/0010302, Hartung et al.
U.S. Pat. No. 8,772,423, Jul. 8, 2014, 2012/0071564, de Gans et al.
U.S. Pat. No. 8,779,079, Jul. 15, 2014, 2011/0021693, Henning et al.
U.S. Pat. No. 8,802,744, Aug. 12, 2014, 2013/0035408, Knott et al.
U.S. Pat. No. 8,883,932, Nov. 11, 2014, 2012/0029090, Brugger et al.
U.S. Pat. No. 8,957,009, Feb. 17, 2015, 2012/0308494, Schubert et al.
U.S. Pat. No. 8,974,627, Mar. 10, 2015, 2012/0067520, Schubert et al.
U.S. Pat. No. 8,993,706, Mar. 31, 2015, 2011/0042004, Schubert et al.
U.S. Pat. No. 9,035,011, May 19, 2015, 2013/0237616, Ferenz et al.
U.S. Pat. No. 9,051,424, Jun. 9, 2015, 2014/0179894, Lobert et al.
U.S. Pat. No. 9,068,044, Jun. 30, 2015, 2012/0296125, Schubert et al.
U.S. Pat. No. 9,115,335, Aug. 26, 2015, 2014/0274863, Trosin et al.
U.S. Pat. No. 9,175,126, Nov. 3, 2015, 2013/0041102, Albrecht et al.
U.S. Pat. No. 9,315,614, Apr. 19, 2016, 2011/0046305, Schubert et al.
U.S. Pat. No. 9,334,354, May 10, 2016, 2015/0057369, Ferenz et al.
U.S. Pat. No. 9,346,919, May 24, 2016, 2014/0303065, Jazkewitsch et al.
U.S. Pat. No. 9,441,145, Sep. 13, 2016, 2015/0159068, Schubert et al.
U.S. Pat. No. 9,481,695, Nov. 1, 2016, 2015/0023900, Knott et al.
U.S. Pat. No. 9,550,928, Jan. 24, 2017, 2016/0053145, Lobert et al.
U.S. Pat. No. 9,783,635, Oct. 10, 2017, 2016/0053051, Schubert et al.
U.S. Pat. No. 9,790,327, Oct. 17, 2017, 2016/0208050, Klotzbach et al.
U.S. Pat. No. 9,896,534, Feb. 20, 2018, 2016/0311963, Lobert et al.
U.S. Pat. No. 9,896,541, Feb. 20, 2018, 2017/0088667, Fiedel et al.
U.S. Pat. No. 9,975,909, May 22, 2018, 2013/0245304, Schubert et al.
U.S. Pat. No. 10,087,278, Oct. 2, 2018, 2017/0226285, Lobert et al.
U.S. Pat. No. 10,106,649, Oct. 23, 2018, 2017/0081469, Fiedel et al.
U.S. Appl. No. 12/277,852, filed Nov. 25, 2008, 2009/0137752, Knott et al.
U.S. Appl. No. 12/414,805, filed Mar. 31, 2009, 2010/0081781, Schubert et al.
U.S. Appl. No. 12/759,787, filed Apr. 14, 2010, 2010/0266518, Springer et al.
U.S. Appl. No. 61/299,485, filed Jan. 29, 2010, Schubert et al.
U.S. Appl. No. 13/195,049, filed Aug. 1, 2011, 2012/0028022, Brugger et al.
U.S. Appl. No. 13/205,834, filed Aug. 9, 2011, 2012/0037036, Viet et al.
U.S. Appl. No. 13/322,477, filed Nov. 25, 2011, 2012/0068110, Schubert et al.
U.S. Appl. No. 13/358,142, filed Jan. 25, 2012, 2012/0190760, Henning et al.

(56) References Cited

OTHER PUBLICATIONS

U.S. Appl. No. 13/650,221, filed Oct. 12, 2012, 2013/0041115, Knott et al.
U.S. Appl. No. 13/771,921, filed Feb. 20, 2013, 2013/0213267, Fiedel et al.
U.S. Appl. No. 13/771,973, filed Feb. 20, 2013, 2013/0217930, Haensel et al.
U.S. Appl. No. 13/923,896, filed Jun. 21, 2013, 2013/0345318, Schubert et al.
U.S. Appl. No. 13/973,024, filed Aug. 22, 2013, 2014/0057819, Haensel et al.
U.S. Appl. No. 14/282,608, filed May 20, 2014, 2014/0256844, Henning et al.
U.S. Appl. No. 14/813,893, filed Jul. 30, 2015, 2015/0329752, Albrecht et al.
U.S. Appl. No. 14/896,781, filed Dec. 8, 2015, 2016/0130402, Schubert et al.
U.S. Appl. No. 14/906,365, filed Jan. 20, 2016, 2016/0160081, Klotzbach et al.
U.S. Appl. No. 15/622,657, filed Jun. 14, 2017, 2018/0010007, Roland et al.
U.S. Appl. No. 15/540,605, filed Jun. 29, 2017, 2018/0016392, Lobert et al.
U.S. Appl. No. 15/741,524, filed Jan. 3, 2018, 2018/0194682, Schubert et al.
U.S. Appl. No. 15/743,232, filed Jan. 9, 2018, Fiedel et al.
U.S. Appl. No. 15/767,894, filed Apr. 12, 2018, 2018/0305596, Schubert et al.
U.S. Appl. No. 16/087,762, filed Sep. 24, 2018, Schubert et al.
U.S. Appl. No. 16/142,408, filed Sep. 26, 2018, Sloot et al.
U.S. Appl. No. 16/268,606, filed Feb. 6, 2019, Seyfried et al.

\* cited by examiner

CURABLE COMPOSITION BASED ON POLYSILOXANES

CROSS-REFERENCE TO RELATED APPLICATIONS

This application claims priority to European patent application 17193627.1 filed Sep. 28, 2017, incorporated herein by reference.

BACKGROUND OF THE INVENTION

Field of the Invention

The invention relates to a curable composition based on polysiloxanes, to the preparation process therefor and to the use thereof.

Discussion of the Background

In a multitude of fields of application, there is a search for surface coatings that prevent or at least reduce adhesion of a wide variety of different kinds of soil.

Particularly on structures subjected to permanent irrigation, as for example in the case of ships' hulls, buoys, fishing nets, draw and drain pipes for cooling, offshore drilling installations or water tanks that are exposed to seawater and/or freshwater, the adhesion and growth of organisms (biofouling) causes considerable economic losses. In the case of ships these result for example from increased friction and concomitant increased fuel consumption. Surfaces also suffer from mechanical damage as a result of the increased resistance to waves or flows in the case of static structures, which leads to shorter maintenance cycles and hence also to reduced service life.

In the case of exterior paints too, there is a search for coatings which prevent or retard overgrowth of microorganisms/algae.

Surface coatings having a surface with self-polishing properties are known from the related art. The self-polishing property can be achieved, inter alia, through the use of degradable polymer coatings which constantly renew their surface by virtue of their continuous degradation characteristics. The effect of such a polymer property may be that very different kinds of stains are also removed and hence the surface remains soil-free. Effects of this kind can be utilized in anti-graffiti, anti-icing, easy-to-clean and anti-dirt-pickup coatings, but also for prevention of biofouling.

Polymers which degrade on contact with water are known in the field of antifouling coatings. Mainly acrylate esters/silylated acrylates are used. A particular substance class is that of the polyesters. In this case, the degradation propensity is determined through choice of the monomers, through the polymer architecture and through the molar mass.

The related art discloses overgrowth-preventing colour compositions in which the polymer of the binder system is a trialkyltin derivative of a polymer having carboxylic acid groups in the monomer segments. They form a coating film which gradually dissolves in seawater and hence prevents the adhesion of biological overgrowth through the secretion of the organotin compound. However, the use thereof in the last few years has become subject to legal restrictions owing to problems with marine pollution, against the background of highly neurotoxic properties of organotin compounds.

There is therefore a need for a suitable binder system for production of coatings capable of preventing the adhesion of microorganisms/algae, in order to prevent or retard biofouling thereby.

SUMMARY OF THE INVENTION

It has been found that, surprisingly, it is possible to use a curable composition comprising, as component A, at least one polysiloxane, component B, at least one polyether bearing silyl groups and/or reaction products of a polyether bearing silyl groups with one or more isocyanate-containing compounds, and component C, at least one catalyst, to produce a coating having such a property.

It has been found that, surprisingly, it is possible to use the composition according to the invention, by virtue of the combination of hydrophilic and hydrophobic components, to produce a coating having a surface with amphiphilic properties which is thus able to counteract biofouling.

DETAILED DESCRIPTION OF THE INVENTION

Any ranges mentioned herein below include all values and subvalues between the lowest and highest limit of this range.

Where chemical (empirical) formulae are used in the present invention, the specified indices may be not only absolute numbers but also average values.

The indices relating to polymeric compounds are preferably average values.

Unless stated otherwise, percentages are figures in percent by weight.

If measured values are reported hereinbelow, these measurements, unless stated otherwise, have been conducted under standard conditions (25° C. and 1013 mbar).

Where averages are reported hereinafter, the values in question are weight averages, unless stated otherwise.

The curable composition according to one embodiment of the invention comprises, as component A, at least one polysiloxane, component B, at least one polyether bearing silyl groups and/or reaction products of a polyether bearing silyl groups with one or more isocyanate-containing compounds, and component C, at least one catalyst.

Preferably, the composition according to the invention includes polyethers bearing silyl groups and having various repeat units that are prepared by reaction with one or more alkylene oxides, glycidyl ethers, carbon dioxide, cyclic anhydrides, isocyanates, caprolactones or cyclic carbonates or mixtures thereof.

The repeat units may preferably have a random distribution and/or blockwise distribution and/or distribution along a gradient.

Preferably, the polyether bearing silyl groups has one or more terminal and/or one or more pendent alkoxysilyl radicals.

Preferably, component B comprises polyethers bearing silyl groups of the formula (I):

Formula (I)

$$\left[\begin{array}{c}\left(R^2\right)_f Si \left(O-R^3\right)_g \\ | \\ (CH_2)_h \\ | \\ O \\ | \\ CH_2 \end{array}\right.$$

$$R^1 - \left[O-\left(\begin{array}{c}H_2 \\ C - C - O \\ | \\ H\end{array}\right)_a - \left(\begin{array}{c}H_2 \ H_2 \\ C - C - O \\ \end{array}\right)_b - \left(\begin{array}{c}R^4 \ R^5 \\ | \ | \\ C - C - O \\ | \ | \\ H \ R^5\end{array}\right)_c\right]_n - R^{1*}$$

where
a=1 to 100, preferably 1 to 10, more preferably 2 to 5,
b=1 to 500, preferably 1 to 400, more preferably 1 to 300,
c=0 to 500, preferably 1 to 400, more preferably 1 to 300,
f=0 to 2,
g=1 to 3,
with the proviso that g+f=3,
h=1 to 10, preferably 1 to 6, more preferably 1 to 3,
n=1 to 10, preferably 1 to 5, especially preferably 1 to 3,
with the proviso that the fragments having the indices a, b and c are distributed over the molecule chain in a freely permutable manner and that the sum total of a, b and c is >3,
and where
$R^1$=a saturated or unsaturated, linear or branched organic hydrocarbyl radical which may contain O, S and/or N as heteroatoms,
the hydrocarbon radical preferably containing 1 to 400 carbon atoms, preferably 1 to 200 carbon atoms, especially preferably 1-20 carbon atoms,
$R^{1*}$=hydrogen, a saturated or unsaturated, linear or branched organic hydrocarbyl radical which may contain O, S and/or N as heteroatoms, the hydrocarbon radical preferably containing 1 to 400 carbon atoms, preferably 1 to 200 carbon atoms, more preferably 1 to 20 carbon atoms,
$R^2$=independently at each instance an alkyl group having 1 to 8 carbon atoms, preferably 1 to 5 carbon atoms,
$R^3$=independently at each instance an alkyl group having 1 to 8 carbon atoms, preferably 1 to 5 carbon atoms,
$R^4$=independently at each instance a hydrogen radical, a linear, branched or cyclic alkyl or chloroalkyl group having 1 to 20 carbon atoms,
$R^5$=independently at each instance a hydrogen radical or a linear, branched or cyclic alkyl or chloroalkyl group having 1 to 20 carbon atoms, an aryl or alkaryl group, and/or reaction products of a polyether bearing silyl groups of the formula (I) with one or more isocyanate-containing compounds, where $R^{1*}$ is preferably a hydrogen.

Polyethers bearing silyl groups are prepared by a process as described in EP 2 093 244 B1, EP 2 289 972 B1 or EP 2 289 961 A1.

The person skilled in the art is sufficiently well aware of the process by which polyethers bearing silyl groups can be prepared.

Indices a, b and c represent the preferred repeat units. Further repeat units d, e, f etc. that have resulted, for example, from reactions with carbon dioxide, cyclic anhydrides, isocyanates, caprolactones or cyclic carbonates or mixtures thereof, are likewise conceivable.

Organic alkoxysilane compounds such as 3-glycidyloxypropyltrimethoxy- or -triethoxysilane, obtainable, for example, under the DYNASYLAN® GLYMO or DYNASYLAN® GLYEO trade names (trademarks of Evonik Degussa GmbH), are involved in the preparation of the preferred component B. Isocyanate-functional alkoxysilane compounds are also usable; for example, 3-isocyanatopropyltrimethoxysilane is obtainable under the Geniosil® GF 40 trade name (from Wacker Chemie) or Silquest® A-Link 35, Silquest* Y-5187 (from Momentive) or 3-isocyanatopropyltriethoxysilane VESTANAT® EP-IPMS (from Evonik Industries AG), KBE-9007 (from ShinEtsu) or Silquest® A-1310/A-Link 25 (from Momentive). These are the repeat units (a).

To produce the repeat units (b) and/or (c), it is generally possible to use any of the alkylene oxides known to the person skilled in the art. Preference is given to using, for example, ethylene oxide (EO), propylene oxide (PO), 1,2-epoxy-2-methylpropane (isobutylene oxide), epichlorohydrin, 2,3-epoxy-1-propanol, 1,2-epoxybutane (butylene oxide, also abbreviated hereinafter as BO), 2,3-epoxybutane, 2,3-dimethyl-2,3-epoxybutane, 1,2-epoxypentane, 1,2-epoxy-3-methylpentane, 1,2-epoxyhexane, 1,2-epoxycyclohexane, 1,2-epoxyheptane, 1,2-epoxyoctane, 1,2-epoxynonane, 1,2-epoxydecane, 1,2-epoxyundecane, 1,2-epoxydodecane, styrene oxide (also abbreviated hereinafter as SO), 1,2-epoxycyclopentane, 1,2-epoxycyclohexane, vinylcyclohexene oxide, (2,3-epoxypropyl)benzene, vinyloxirane, 3-phenoxy-1,2-epoxypropane, 2,3-epoxy methyl ether, 2,3-epoxy ethyl ether, 2,3-epoxy isopropyl ether, 3,4-epoxybutyl stearate, 4,5-epoxypentyl acetate, 2,3-epoxypropane methacrylate, 2,3-epoxypropane acrylate, glycidyl butyrate, methyl glycidate, ethyl 2,3-epoxybutanoate, 4-(trimethylsilyl)butane 1,2-epoxide, 4-(triethylsilyl)butane 1,2-epoxide, 3-(perfluoromethyl)-1,2-epoxypropane, 3-(perfluoroethyl)-1,2-epoxypropane, 3-(perfluorobutyl)-1,2-epoxypropane, 3-(perfluorohexyl)-1,2-epoxypropane, 4-(2,3-epoxypropyl)morpholine, 1-(oxiran-2-ylmethyl)pyrrolidin-2-one.

All the alkylene oxides mentioned may be used individually or in any desired mixtures.

Particular preference is given to using ethylene oxide and/or propylene oxide. Preferably, component B has a higher proportion of repeat units (b) than the repeat units (a) and/or (c).

Preferably, the polyether bearing silyl groups has a ratio of repeat units of b to a of >5:1, more preferably >8:1, even more preferably >10:1, and especially a ratio of b to a between 11:1 and 20:1.

It is assumed that a high proportion of repeat units (b), after hydration, brings about and/or promotes the formation of a hydrogel. It is suspected that the substrate surface (ships' hulls, buoys, fishing nets, etc.) is "masked" as a result and the microorganisms do not perceive it as a surface.

Preferably, the process for preparing the polyethers bearing silyl groups is conducted in such a way that the polyether bearing silyl groups has an NCO value of <0.1% by weight.

Preferably, the isocyanate-containing compounds are mono-, di- and/or trifunctional isocyanates selected from the group of methyl isocyanate, ethyl isocyanate, propyl isocyanate, butyl isocyanate, further linear or branched or cyclic C4-C20 alkyl monoisocyanates, particularly lauryl isocyanate, stearyl isocyanate, toluene 2,4-diisocyanate (TDI), diphenylmethane diisocyanate or methylene diphenyl diisocyanate (MDI), hexamethylene diisocyanate (HMDI), 2,2,4-trimethylhexane 1,6-diisocyanate (TMDI), polymeric diphenylmethane diisocyanate (PMDI), isophorone diisocyanate (IPDI), 4,4'-diisocyanatodicyclohexylmethane (H12MDI), isophorone diisocyanate (IPDI), triphenylmethane triisocyanate, benzene 1,3,5-triisocyanate and toluene 2,4,6-triisocyanate.

The urethanization of the polyether containing silyl groups is known to the person skilled in the art from U.S. Pat. No. 9,035,011 (EP2 636 696) oder U.S. Pat. No. 8,993,706, U.S. Pat. No. 9,441,145 (EP2 289 972).

Preferably, the polysiloxane is a linear or singly or multiply branched Si—OH— or SiOR$^3$-functional polysiloxane.

Hydroxy-functional siloxanes are obtainable, inter alia, from Evonik Industries under the Polymer OH trade name, but also, for example, from Dow Corning under the product names DOW CORNING® 3-3602, XIAMETER® OHX-4081, DOW CORNING® 5-0299, XIAMETER® OHX-4000 POLYMER 2000CS, XIAMETER® OHX-4081, XIAMETER® PMX-0156 SILANOL FLUID.

Alkoxy-functional methyl- or else methyl/phenylsiloxane oligomers are obtainable from ShinEtsu, for example KC-89S, KR-500, X 40-9225, X 40-9246, X 40-9250, KR-401N, X-40-9227, KR-510, KR-9218, KR-213. Hybrids including a further functionality, for example an epoxy functionality, are also obtainable, such as X-41-1053, X-41-1059A, X-24-9590, KR-516.

Methoxy-functional methyl- and methyl/phenylsiloxanes are obtainable from Dow Corning under the trade names Dow Corning® US-CF 2403 Resin, US-CF 2405 Resin, 3037 Intermediate, 3074 Intermediate, RSN-5314 Intermediate. Silanol-functional methyl/phenyl resins are marketed under the trade names RSN-0409 HS Resin, RSN-0431 HS Resin, RSN-0804 Resin, RSN-0805 Resin, RSN-0806 Resin, RSN-0808 Resin, RSN-0840 Resin.

Epoxy-functional siloxanes are commercially available inter alia from Evonik Industries under the trade name TEGOMER® E-Si 2330 or from ShinEtsu under the trade names KF-105, X22-163 a, X22-163 b, X22-163 c, X22 -169 As, X22-169 B or Dow Corning Toray AY 42-119, BY 16-760, BY 16-839, BY 16-869, BY 16-870, BY 16-877. Epoxy compounds are commercially available inter alia from Momentive/Hexion under the trade names Epon, Eponex, Epalloy and from Ipox Chemicals under the trade names ipox ER, ipox CL and ipox RD.

Alkoxy-functional methyl/phenyl- and methylsilicone resins, which are also supplied in partly hydrolysed form to the corresponding silanol, are commercially available under the SILRES® trade name from Wacker Chemie, for example REN 50, REN 60, REN 80, KX, HK 46, MSE 100 or SY 300, IC 836, REN 168, SY 409, IC 232, SY 231, IC 368, IC 678.

The preparation of silicone resins of these kinds has long been known in the literature (in this regard see W. Noll-Chemie and Technologie der Silicone [Chemistry and Technology of the Silicones], Wiley-VCH Verlag GmbH & Co. KGaA, Weinheim, 1960), and is also described in German patent specification DE 34 12 648.

The polysiloxane is preferably an alkoxypolysiloxane.

As a further constituent, the composition preferably includes at least one epoxy-functional compound and one amino-functional compound.

The epoxy-functional compound preferably comprises epoxy-functional silanes or siloxanes or aromatic or aliphatic glycidyl ethers or condensates thereof or mixtures thereof.

Preferred epoxy-functional compounds are the epichlorohydrin-derived glycidyl ethers, glycidyl esters and glycidylamines, more preferably bisphenol A diglycidyl ether, bisphenol F diglycidyl ether, glycidyl ethers of novolaks (epoxy-novolak resins), hydrogenated bisphenol A diglycidyl ether, hydrogenated bisphenol F diglycidyl ether, phenyl glycidyl ether, cresyl glycidyl ether, tert-butyl glycidyl ether, diglycidylaniline, tetraglycidylmethylenedianiline, triglycidylaminophenol, hexane 1,6-diglycidyl ether, butane 1,4-diglycidyl ether, cyclohexane dimethyl diglycidyl ether, alkyl glycidyl ethers, benzyl glycidyl ether, trimethylolpropane triglycidyl ether, pentaerythritol tetraglycidyl ether, brominated glycidyl ethers such as tetrabromobisphenol A diglycidyl ether, alkyl glycidyl esters, triglycidyl isocyanurate, allyl glycidyl ether, poly(alkylene glycol) diglycidyl ethers, and epoxide compounds of unsaturated hydrocarbons and unsaturated fats and/or fatty acids. Likewise preferred are oligomeric and polymeric epoxide compounds selected from polyolefins bearing epoxy groups and siloxanes, or epoxide compounds formed by chain extension preferably from diglycidyl ethers with OH-functional compounds. Particularly preferred are epoxide compounds having two or more than two epoxy groups per molecule.

Preferably, the amino-functional compound is an amino-functional alkoxysilane, preferably an amino-functional di- or trialkoxysilane. Such amino-functional di- or trialkoxysilanes are commercially available, for example under the trade names Dynasylan® (Evonik Industries AG), Silquest® (Momentive), KBE903, KBM903, KBM603, KBE603, KBM602 (ShinEtsu), Geniosil® (Wacker Chemie) or Z-6011, AZ-720, Z-6610, Z-6015, Z-6020Z, Z-6094, Z-6021, 1-6436Z-6023, AY43-009 (Dow Corning).

Preferably, the stoichiometric ratio of epoxy function to amino function is in the range from 5:0.1 to 0.1:5, preferably 1:1.5, more preferably 1:1.

Preferably, the composition according to the invention includes at least one crosslinker of the formula (II)

$$R^6{}_d Si(OR^7)_e \qquad \text{Formula (II)}$$

with the proviso that $0 \leq d \leq 2$, $0 \leq e \leq 4$ and $d+e=4$,

R$^6$=independently at each instance an alkyl group or cycloalkyl group having 1 to 8 carbon atoms or an aromatic group having 6 to 20 carbon atoms, R$^7$=independently at each instance an alkyl group having 1 to 8 carbon atoms, preferably a methyl, ethyl, propyl or isopropyl group.

Alkyl groups may for example be methyl, ethyl, propyl, isopropyl, n-butyl, sec-butyl and tert-butyl group. An aromatic moiety may be a phenyl moiety, for example. Preferred substituents R are methyl or phenyl or mixtures of methyl and phenyl where the Ph:Me ratio may be in the range from 0:1 to 1:0.

Preference is given to using catalysts selected from the group of catalysts that promote the hydrolysis condensation mechanism, such as organotin catalysts, titanates or zirconates, organometallic compounds of aluminium, iron, calcium, magnesium, zinc or bismuth, Lewis acids or organic acids/bases, linear or cyclic amidines, guanidines or amines or a mixture thereof.

Preferred catalysts are the hydrolysis/condensation catalysts for alkoxysilanes that are known to those skilled in the art. Preference is given to using, as curing catalysts, organic tin compounds, for example, dibutyltin dilaurate, dibutyltin diacetylacetonate, dibutyltin diacetate, dibutyltin dioctoate, or dioctyltin dilaurate, dioctyltin diacetylacetonate, dioctyltin diketanoate, dioctylstannoxane, dioctyltin dicarboxylate, dioctyltin oxide, preferably dioctyltin diacetylacetonate, dioctyltin dilaurate, dioctyltin diketanoate, dioctylstannoxane, dioctyltin dicarboxylate, dioctyltin oxide, more preferably dioctyltin diacetylacetonate and dioctyltin dilaurate. In addition, it is also possible to use zinc salts, such as zinc octoate, zinc acetylacetonate and zinc-2-ethylcaproate, or tetraalkylammonium compounds, such as N,N,N-trimethyl-N-2-hydroxypropylammonium hydroxide, N,N,N-trimethyl-N-2-hydroxypropylammonium 2-ethylhexanoate or choline 2-ethylhexanoate. Preference is given to the use of zinc octoate (zinc 2-ethylhexanoate) and of the tetraalkylammonium compounds, particular preference to that of zinc octoate. Preference is further given to bismuth catalysts, e.g. TIB Kat (TIB Mannheim) or Borchi® catalysts, titanates, e.g. titanium(IV) isopropoxide, iron(III) compounds, e.g. iron(III) acetylacetonate, aluminium compounds, such as aluminium triisopropoxide, aluminium tri-sec-butoxide and other alkoxides and also aluminium acetylacetonate, calcium compounds, such as calcium disodium ethylenediaminetetraacetate or calcium diacetylacetonate, or else amines, examples being triethylamine, tributylamine, 1,4-diazabicyclo[2.2.2]octane, 1,8-diazabicyclo[5.4.0] undec-7-ene, 1,5-diazabicyclo[4.3.0] non-5-ene, N,N-bis(N,N-dimethyl-2-aminoethyl)methylamine, N,N-dimethylcyclohexylamine, N,N-dimethylphenylamine, N-ethylmorpholine, etc. Also preferred as catalysts are organic or inorganic Brønsted acids such as acetic acid, trifluoroacetic acid, methanesulfonic acid, p-toluenesulfonic acid or benzoyl chloride, hydrochloric acid, phosphoric acid and the monoesters and/or diesters thereof, for example butyl phosphate, (iso)propyl phosphate, dibutylphosphate, etc. Preference is further given to organic and organosilicon compounds that bear guanidine groups. It is of course also possible to use combinations of two or more catalysts. In addition, it is also possible to use photolatent bases as catalysts, as described in WO 2005/100482.

The curing catalyst is used in amounts of 0.1% to 5.0% by weight, preferably 0.2% to 4.0% by weight and more preferably 0.5% to 3% by weight, based on the sum total by mass of component (A), of compound (b1) and of the optional alkoxysilane compounds.

The composition according to the invention preferably comprises further additives selected from the group of the plasticizers, fillers, solvents, adhesion promoters, rheology additives, stabilizers, catalysts and drying agents, especially chemical moisture drying agents.

It may be advantageous when the curable mixture according to the invention includes a drying agent, for the purpose, for example, of binding moisture or water which is introduced by components of the formulation or which is incorporated subsequently as a result of the dispensing operation or the storage process. Drying agents which can be used in the curable mixtures according to the invention are in principle all drying agents known from the prior art. Preferred chemical drying agents include vinyltrimethoxysilane (Dynasylan® VTMO, Evonik or Geniosil® XL 10, Wacker), vinyltriethoxysilane (Dynasylan® VTEO, Evonik or Geniosil® GF 56, Wacker), N-trimethoxysilylmethyl-O-methylcarbamate (Geniosil® XL 63, Wacker), N-dimethoxy(methyl)silylmethyl-O-methylcarbamate, N-methyl[3-(trimethoxysilyl)propyl]carbamate (Geniosil® GF 60, Wacker), vinyldimethoxymethylsilane (Geniosil® XL 12, Wacker), vinyltris(2-methoxyethoxy)silane (Geniosil® GF 58, Wacker), bis(3-triethoxysilylpropyl)amine (Dynasylan® 1122, Evonik), bis(3-trimethoxysilylpropyl)amine (Dynasylan® 1124), N-dimethoxy(methyl)silylmethyl O-methylcarbamate (Geniosil® XL 65, Wacker) or oligomeric vinylsilanes, for example Dynasylan® 6490 and Dynasylan® 6498 (both available from Evonik), alone or mixtures thereof. The drying agents are more preferably selected from vinyltrimethoxysilane (Dynasylan® VTMO, Evonik or Geniosil® XL 10, Wacker AG), vinyltriethoxysilane (Dynasylan® VTEO, Evonik or Geniosil® GF 56, Wacker). In addition, it may be advantageous when a physical drying agent, such as preferably zeolite, molecular sieve, anhydrous sodium sulfate or anhydrous magnesium sulfate, is used additionally or alternatively to chemical drying.

The proportion of the drying agents in the curable compositions according to the invention is preferably from greater than 0% to 5% by weight, preferably from 0.2% to 3% by weight, based on the use amount of polymers bearing alkoxysilyl groups.

Employment of solvents may also be useful. These solvents may serve, for example, to lower the viscosity of the uncrosslinked binder, or may facilitate adsorption onto the surface. Useful solvents in principle include all solvents and solvent mixtures. The choice of a suitable solvent may be made from the group of the alkanes, alkenes, alkynes, benzene and aromatics with aliphatic and aromatic substituents, carboxylic esters, linear and cyclic ethers and, at high pressures, carbon dioxide as well, halogenated aliphatic or aromatic hydrocarbons, ketones or aldehydes, lactones (y-butyrolactone), lactams (e.g. N-methyl-2-pyrrolidone), nitriles, nitro compounds, tertiary carboxamides (dimethylformamide), urea derivatives such as tetramethylurea or dimethylpropyleneurea (DMPU), sulfoxides such as dimethyl sulfoxide (DMSO), sulfones such as sulfolane, carbonic esters such as dimethyl carbonate or ethylene carbonate. Mention may also be made of protic solvents such as water, methanol, ethanol, n- and isopropanol and other alcohols, primary and secondary amines, carboxylic acids and esters thereof, and also anhydrides, primary and secondary amides such as formamide. Preference is given to solvents accepted in coating applications such as ethers, e.g. t-butyl methyl ether, esters, for example ethyl acetate or n-butyl acetate, tert-butyl acetate or diethyl carbonate, and alcohols, for example ethanol and the various regioisomers of propanol and butanol. Preferred solvents also include aromatic and/or aliphatic solvents such as benzene, toluene or naphtha cuts.

As and when required, the curable mixtures according to the invention may further comprise one or more substances selected from the group encompassing co-crosslinkers, flame retardants, deaerating agents, curing accelerators for the amine-epoxide reaction, antimicrobial and preservative substances, dyes, colorants and pigments, anti-freezes, fungicides and/or reactive diluents and also complexing agents, spraying assistants, wetting agents, fragrances, light stabilizers, free-radical scavengers, UV absorbers and stabilizers, especially stabilizers to counter thermal and/or chemical stresses and/or stresses caused by ultraviolet and visible light.

UV stabilizers are preferably known products based on hindered phenolic systems or benzotriazoles. Light stabilizers used may be, for example, those known as HALS amines. Stabilizers used may, for example, be the products known to those skilled in the art or product combinations composed, for example, of Tinuvin® stabilizers (BASF), for example Tinuvin® 1130, Tinuvin® 292 or else Tinuvin® 400, preferably Tinuvin® 1130 in combination with Tinuvin® 292. The amount in which they are used is determined by the degree of stabilization required.

Suitable pigments for colouring in the case of coating systems are particularly inorganic pigments such as metal oxides or spinel pigments. For improvement of corrosion protection, it is also possible to use the typical anticorrosion pigments, for example zinc phosphate.

Fillers are preferably precipitated or ground chalk, inorganic carbonates in general, precipitated or ground silicates, precipitated or fumed silicas, glass powders, hollow glass beads (called bubbles), metal oxides, for example $TiO_2$, $Al_2O_3$, natural or precipitated barium sulfates, quartz flours, sand, aluminium trihydrates, talc, mica, cristobalite flours, reinforcing fibres, such as glass fibres or carbon fibres, long-fibre or short-fibre wollastonites, cork, carbon black or graphite. It may be advantageous to use hydrophobized fillers, since these products have lower water ingress and improve the storage stability of the formulations.

The composition according to the invention preferably contains 1% by weight to 85% by weight, preferably 5% by weight to 75% by weight, more preferably 20% by weight to 60% by weight, of component A, 1% by weight to 50% by weight, preferably 10% by weight to 40% by weight, more preferably from 15% by weight to 35% by weight, of component B, 0.01% by weight to 5% by weight, preferably 0.05% by weight to 3% by weight, more preferably from 0.1% by weight to 2% by weight, of component C, based on 100% by weight of the composition.

It may preferably contain 0.1% by weight to 40% by weight, preferably 10.0% by weight to 35% by weight, more preferably from 20.0% by weight to 30.0% by weight, of component D consisting of at least one epoxy-functional compound and one amino-functional compound based on the overall composition.

Component D is preferably composed of 30% by weight to 95% by weight, preferably 40% by weight to 90% by weight, more preferably of 65% by weight to 85% by weight, of the epoxy-functional compound and of 0.1% by weight to 50% by weight, preferably 5% by weight to 40% by weight, more preferably of 10% by weight to 30% by weight, of the amino-functional compound based on the overall composition.

Preferably, component D includes more epoxy-functional compound than the amino-functional compound.

Preferably, the composition according to the invention has a water content of <1000 ppm, preferably <200 ppm, more preferably <50 ppm.

By the addition of drying agents, it is possible to achieve the water content of down to 0 ppm.

Advantageously, the composition according to the invention includes a sufficient amount of drying agents to increase the storage stability of the composition, especially in one-component systems.

Depending on the site of storage, manner of storage and further additives, the person skilled in the art is able to determine the sufficient amount of drying agents.

It is also conceivable to provide the composition according to the invention as two-component systems. In this case, component A component B are provided separately from component C. The provision of the composition according to the invention can be adapted to the already existing production process of the respective coating.

Another variant of the two-component systems is the composition according to the invention in the presence of a component D. In this case, the proportion of epoxy-functional compound is provided together with component A and component B, but component C is to be provided separately therefrom and the amine-functional compound of component D, if appropriate, separately from the other component as well.

It is known to those skilled in the art that further variants of the composition are possible. The composition has to be adapted to the respective circumstances of processing in terms of production and use.

The invention further provides coatings, paints and dyes comprising a curable composition according to the invention.

A further invention is the use of the curable composition for production of coatings, paints and dyes, preferably for prevention or reduction of biofouling.

The coating system according to the invention that is applied to the substrate cures with ingress of air humidity via a catalysed hydrolysis-condensation crosslinking process. Combined forced drying at elevated temperature and accompanying chemical crosslinking via hydrolysis-condensation with introduction of sufficient moisture into the oven are not mutually exclusive, and this depends to a crucial degree on the substrate to be coated.

The subject-matter of the invention will be described by way of example below, without any intention that the invention be restricted to these illustrative embodiments.

Having generally described this invention, a further understanding can be obtained by reference to certain specific examples which are provided herein for purposes of illustration only, and are not intended to be limiting unless otherwise specified.

EXAMPLES

Methods
Drying Time Measurements

A suitable means of assessing the catalytic activity of catalysts in a binder is to determine the drying time using a drying recorder. A test method of this kind is described by ASTM D5895. In analogy to this test method, drying time measurements were conducted using a BK3 Drying Recorder (The Mickle Laboratory Engineering Co. Ltd., Goose Green, Gomshall, Guildford, Surrey GU5 9LJ, UK). In this procedure, binder films were applied to standard glass strips (30×2.5 cm×2 mm) using a four-way bar coater (Erichsen Model 360, wet film thickness 100 μm). The standard glass strips were previously freed of dust and adhering soil and grease with acetone and subsequently with an ethanol/demineralized water mixture. Using a lever on the reverse side, the slide was then shifted leftward into the start position. The scoring scribes were then folded down onto the sample glass plates. The test duration was set to 24 hours, and measurement was commenced. After 24 hours, if necessary, the needle was placed back at the starting point in order to enable a 48-hour value. After the end of the test duration, the scoring scribes were folded up and the glass plates were removed for assessment. The instants of initial drying and volume drying were read off using the associated timescale.

Inert Method

Under "inert" conditions is meant that the gas space within the apparatus is filled with an inert gas, e.g. nitrogen or argon. This is achieved by the flooding of the apparatus, optionally followed by a gentle inert gas stream that ensures continual inertization.

Application

Application of the binder composition is generally effected by spray application, but may also be applied by other application techniques such as, for example, brushing, rolling, flow coating, dipping, wiping and pouring. Suitable substrates include metallic substrates such as, for example, steel, cast steel, stainless steel, aluminium, cast aluminium or hot dip galvanized steel. For improved adhesion, the substrate may be roughened by sandblasting or sanding. Nonmetallic substrates such as glass, plastics, or inorganic substrates such as ceramics, stoneware, concrete etc., may also be employed.

The binder composition according to the invention that is applied to the substrate then cures with ingress of air humidity via a catalysed hydrolysis-condensation crosslinking process. Combined forced drying at elevated temperature and accompanying chemical crosslinking through hydrolysis-condensation with introduction of sufficient moisture into the oven are not mutually exclusive.

A further advantage of hydrolysis-condensation coating systems with an added catalyst is that they are not subject to any pot life problems in the case of closed containers, since the curing does not take place until water from the surrounding air humidity is present. In contrast to the conventional, purely physically drying coating systems, for example silicone resin-based, which must first be baked at object temperatures of 250° C. for at least 30 minutes in order to achieve their full mechanical and chemical stability, a complete saving can be made here on the oven drying energy.

Viscosity

The viscosity was determined shear rate-dependently at 25° C. with the MCR301 rheometer from Anton Parr in a plate/plate arrangement with a gap width of 1 mm. The diameter of the upper plate was 40 mm. The viscosity at a shear rate of 10 s$^{-1}$ was read off and is set out in Tables 2 and 3.

GPC measurements for determining the polydispersity and average molar masses were carried out under the following measuring conditions: Column combination SDV 1000/10 000 Å (length 65 cm), temperature 30° C., THF as mobile phase, flow rate 1 ml/min, sample concentration 10 g/l, RI detector, evaluation against polypropylene glycol standard (6000 g/mol).

NCO Content

The NCO content in per cent was determined by back-titration with 0.1 molar hydrochloric acid following reaction with dibutylamine in accordance with DIN EN ISO 11909.

Further Conditions

Where % figures are given in the context of the present invention, the figures in question are in weight % unless stated otherwise. In the case of compositions, the % figures are based on the entire composition unless stated otherwise. Where averages are reported hereinafter, these are number averages unless stated otherwise. Where measurement values are reported hereinafter, these measurement values, unless stated otherwise, have been determined under a pressure of 101 325 Pa, at a temperature of 23° C. and the ambient relative atmospheric humidity of about 40%. Materials and equipment Glass plates, manufacturer: Gläserei Glänzer, dimensions: 90×150×5mm PVC sheets, Mat. No: 4364002858, KVG Kunststoff Betriebs GmbH 300 μm bar applicator, manufacturer: Simex
300 μm cube applicator, manufacturer: TQC GmbH
Dispermat, VMA Getzmann with Teflon disc
Wide-neck glass bottles
Chemicals and raw materials used Component A (polysiloxane)_Four polysiloxanes were used.

TABLE 1

| Polysiloxanes: | | | |
|---|---|---|---|
| Type and source | Phenyl/methyl ratio (Ph:Me) | Methoxy value (% by wt.) | Molecular weight (Mw = kg/mol) |
| A1 US-CF 2405, from Dow Corning | 1:0 | 28 | ~4 |
| A2 3037 Intermediate, from Dow Corning | 0.25:1 | 15-18 | ~1 |

TABLE 1-continued

| Polysiloxanes: | | | |
|---|---|---|---|
| Type and source | Phenyl/methyl ratio (Ph:Me) | Methoxy value (% by wt.) | Molecular weight (Mw = kg/mol) |
| A3 3074 Intermediate, from Dow Corning | 1:1 | 15-18 | ~1.3 |
| A4 Polymer OH 20, from Evonik | | CAS No. 70131-67-8 | |

Component B (reaction products with polyether bearing silyl groups)

Three components B1 to B3 were used, where B1 and B2 do not have any repeat unit (b).

B1 is a polyurethane terminated by trimethoxysilyl groups, prepared by a process according to EP1 093 482 (U.S. Pat. No. 6,884,852), which has a viscosity of 35 000 mPas.

Preparation of B2

A 5 litre autoclave was charged with 400 g of polypropylene glycol with an average molar mass of 2000 g/mol and this initial charge was admixed with 150 ppm (based on the total batch) of a zinc hexacyanocobaltate double metal cyanide catalyst. The reactor was inertized by injecting nitrogen to 3 bar and then decompressing to standard pressure. This operation was repeated twice more. While stirring, the contents of the reactor were heated to 130° C. and evacuated to about 20 mbar to remove volatile components. After 30 minutes, the catalyst was activated by the metered introduction into the evacuated reactor of 80 g of propylene oxide. The internal pressure rose initially to about 0.8 bar. After about 6 minutes, the reaction set in, as evident from a drop in the internal reactor pressure. Then, within about 180 minutes, at 90-110° C., a mixture of 2352 g of propylene oxide and 166.8 g of Dynasylan® GLYEO (from Evonik) was metered in continuously. After further reaction for one hour, the mixture was deodorized at <100 mbar in order to remove residues of unconverted alkylene oxide. Then 500 ppm of Irganox® 1135 (from BASF) were stirred in for 15 minutes. A colourless, viscous prepolymer (16 500 mPas at 25° C.) was obtained, having an average of 3 mol of triethoxysilyl groups and 2 OH groups per molecule and a polydispersity $M_w/M_n$ of 2.3. The proportion by weight of EO in the prepolymer was 0%.

At 60° C., 97.7 g of isophorone diisocyanate were added, the mixture was stirred for five minutes, and 0.08 g of TIB Kat 216 (dioctyltin dilaurate) was added. The mixture was stirred for 45 minutes and heated to 80° C., and 216 g of a polyether of the general formula $C_4H_9O[CH_2CH(CH_3)O]_{5.6}H$ were added. This was followed by stirring for a further 3 hours.

The finished product B2 had a viscosity of 67 000 mPas at 25° C. and a polydispersity $M_w/M_n$ of 5.2. The NCO content was <0.1% Preparation of B3.

A 5 litre autoclave was charged with 400 g of polypropylene glycol with an average molar mass of 2000 g/mol, to which were added 150 ppm (based on the overall mixture) of a zinc hexacyanocobaltate double metal cyanide catalyst. The reactor was inertized by injecting nitrogen to 3 bar and then decompressing to standard pressure. This operation was repeated twice more. While stirring, the contents of the reactor were heated to 130° C. and evacuated to about 20 mbar to remove volatile components. After 30 minutes, the catalyst was activated by the metered introduction into the evacuated reactor of 80 g of propylene oxide. The internal pressure rose initially to about 0.8 bar. After about 6 minutes, the reaction set in, as evident from a drop in the internal reactor pressure. Then, within about 180 minutes, at 90-110° C., a mixture of 1847 g of propylene oxide, 449 g of ethylene oxide and 222.4 g of Dynasylan® GLYEO (from Evonik) was metered in continuously. After further reaction for one hour, the mixture was deodorized at <100 mbar in order to remove residues of unconverted alkylene oxide. Then 500 ppm of Irganox® 1135 (from BASF) were stirred in for 15 minutes. A colourless, viscous prepolymer (14 000 mPas at 25° C.) was obtained, having an average of 4 mol of triethoxysilyl groups and 2 OH groups per molecule and a polydispersity $M_w/M_n$ of 2.5. The proportion by weight of EO in the prepolymer was 15.0%.

At 60° C., 107 g of isophorone diisocyanate were added, the mixture was stirred for five minutes, and 0.08 g of TIB Kat 216 (dioctyltin dilaurate) was added. The mixture was stirred for 45 minutes and heated to 80° C., and 224 g of a polyether of the general formula $C_4H_9O[CH_2CH(CH_3)O]_{5.6}H$ were added. This was followed by stirring for a further 3 hours.

The finished product B3 had a viscosity of 56 000 mPas at 25° C. and a polydispersity $M_w/M_n$ of 5.0. The NCO content was <0.1%.

Component C (catalyst)

The catalyst used was the TibKat 318 (DBTL) product from TIB Mannheim with CAS No. 68299-15-0.

Component D

Epoxy-functional and amino-functional compounds are commercial products.

TABLE 2

Epoxy-functional and amino-functional compound

| | Epoxy-functional/amino-functional compound | Source | Product name | Property |
|---|---|---|---|---|
| D1 | α,ω-epoxypropoxypropyl-functional polydimethylsiloxane | Gelest | DMS-E12, CAS No. 102782-97-8 | Epoxy 1.7 eq/kg (=588 g/eq) |
| D2 | Epoxy resin | Hexion | Eponex Resin 1510 | Epoxy 4.717 eq/kg (=212 g/eq) |
| D3 | Aminopropyltriethoxysilane | Evonik | Dynasylan AMEO, CAS No. 919-30-2 | |

Solvent

Xylene, isomer mixture (from Aldrich, CAS No. 1330-20-7)

Isopropanol (from Aldrich, article number 59300-M)

Production of the composition and application to determine the coating quality, drying characteristics and antifouling propensity The inventive compositions Z1-Z12 and the comparative compositions VZ1-VZ36 were produced according to the figures in Tables 3-6 as follows:

Nitrogen-inertized wide-neck bottles (250 ml) were initially charged with component A and blanketed with component B. Then homogenization was effected by means of a Dispermat equipped with a Teflon disc (VMA Getzmann) at 2000 rpm for 2 minutes. Then, firstly, the epoxy-functional component D1 or D2 was added and homogenized and, in addition, the calculated amount of the amino-functional catalyst D3 was added. After repeated homogenization at 2000 rpm for 2 minutes, the catalyst C was added and the mixture was homogenized again. In the case of curable compositions with no component D, component C was added directly subsequent to component B; homogenization was effected analogously. All mixing operations in the Dispermat were conducted such that introduction of gas into the composition was kept as minimal as possible. An inert gas blanket safeguarded the gas volume above the binder phase.

After a short period at rest of 5 minutes, the inventive compositions and comparative compositions, for assessment of the film properties, were drawn down by means of a 300 µm bar applicator (300 µm bar applicator, from Simex) at RT onto isopropanol-cleaned glass plates (from Gläserei Glänzer, dimensions: 90×150×5 mm) and dried at RT; to determine the drying time, they were applied to standard glass strips (30×2.5 cm×2 mm) by means of a bar applicator (from Erichsen Model 360, wet film thickness 100 µm). In addition, PVC panels (200×400×5 mm, cat. no.:4364002858, KVG Kunststoff Betriebs GmbH) previously pretreated with a commercial primer for better adhesion were coated by spray application. The necessary spray viscosities were attained by dilution with xylene (isomer mixture). Finally, drying was effected for 24 hours at RT in drying cabinets provided for the purpose.

TABLE 3

Compositions comprising component A1

| | | VZ1 | VZ2 | VZ3 | Z1 | VZ4 | VZ5 | VZ6 | Z2 | VZ7 | VZ8 | VZ9 | Z3 |
|---|---|---|---|---|---|---|---|---|---|---|---|---|---|
| Component A | A1 | 70 | 70 | 70 | 70 | 70 | 70 | 70 | 70 | 70 | 70 | 70 | 70 |
| Component B | B1 | 30 | | | | | 30 | | | | 30 | | |
| | B2 | | 30 | | | 30 | | | 30 | | | 30 | |
| | B3 | | | 30 | 30 | | | 30 | | 30 | | | 30 |
| Component C | Catalyst* | 2 | 2 | 2 | 2 | 2 | 2 | 2 | 2 | 2 | 2 | 2 | 2 |
| Component D | D1 | | | | | 30 | 30 | 30 | 30 | | | | |
| | D2 | | | | | | | | | 30 | 30 | 30 | 30 |
| | D3** | | | | | 1:1 | 1:1 | 1:1 | 1:1 | 1:1 | 1:1 | 1:1 | 1:1 |

The figures are given as parts by weight, except that

*component C is reported in % by weight based on the overall composition and

**the amount of component D3 is calculated by means of the ratio of D1 or D2 in accordance with the molar ratio specified.

TABLE 4

Compositions comprising component A2

| | | VZ10 | VZ11 | VZ12 | Z4 | VZ13 | VZ14 | VZ15 | Z5 | VZ16 | VZ17 | VZ18 | Z6 |
|---|---|---|---|---|---|---|---|---|---|---|---|---|---|
| Component A | A2 | 70 | 70 | 70 | 70 | 70 | 70 | 70 | 70 | 70 | 70 | 70 | 70 |
| Component B | B1 | | 30 | | | | 30 | | | | 30 | | |
| | B2 | | | 30 | | | | 30 | | | | 30 | |
| | B3 | | | | 30 | | | | 30 | | | | 30 |
| Component C | Catalyst* | 2 | 2 | 2 | 2 | 2 | 2 | 2 | 2 | 2 | 2 | 2 | 2 |
| Component D | D1 | | | | | 30 | 30 | 30 | 30 | | | | |
| | D2 | | | | | | | | | 30 | 30 | 30 | 30 |
| | D3** | | | | | 1:1 | 1:1 | 1:1 | 1:1 | 1:1 | 1:1 | 1:1 | 1:1 |

The figures are given as parts by weight, except that
*component C is reported in % by weight based on the overall composition and
**the amount of component D3 is calculated by means of the ratio of D1 or D2 in accordance with the molar ratio specified.

TABLE 5

Compositions comprising component A3

| | | VZ19 | VZ20 | VZ21 | Z7 | VZ22 | VZ23 | VZ24 | Z8 | VZ25 | VZ26 | VZ27 | Z9 |
|---|---|---|---|---|---|---|---|---|---|---|---|---|---|
| Component A | A3 | 70 | 70 | 70 | 70 | 70 | 70 | 70 | 70 | 70 | 70 | 70 | 70 |
| Component B | B1 | | 30 | | | | 30 | | | | 30 | | |
| | B2 | | | 30 | | | | 30 | | | | 30 | |
| | B3 | | | | 30 | | | | 30 | | | | 30 |
| Component C | Catalyst* | 2 | 2 | 2 | 2 | 2 | 2 | 2 | 2 | 2 | 2 | 2 | 2 |
| Component D | D1 | | | | | 30 | 30 | 30 | 30 | | | | |
| | D2 | | | | | | | | | 30 | 30 | 30 | 30 |
| | D3** | | | | | 1:1 | 1:1 | 1:1 | 1:1 | 1:1 | 1:1 | 1:1 | 1:1 |

The figures are given as parts by weight, except that
*component C is reported in % by weight based on the overall composition and
**the amount of component D3 is calculated by means of the ratio of D1 or D2 in accordance with the molar ratio specified.

TABLE 6

Compositions comprising component A4

| | | VZ28 | VZ29 | VZ30 | Z10 | VZ31 | VZ32 | VZ33 | Z11 | VZ34 | VZ35 | VZ36 | Z12 |
|---|---|---|---|---|---|---|---|---|---|---|---|---|---|
| Component A | A4 | 70 | 70 | 70 | 70 | 70 | 70 | 70 | 70 | 70 | 70 | 70 | 70 |
| Component B | B1 | | 30 | | | | 30 | | | | 30 | | |
| | B2 | | | 30 | | | | 30 | | | | 30 | |
| | B3 | | | | 30 | | | | 30 | | | | 30 |
| Component C | Catalyst* | 2 | 2 | 2 | 2 | 2 | 2 | 2 | 2 | 2 | 2 | 2 | 2 |
| Component D | D1 | | | | | 30 | 30 | 30 | 30 | | | | |
| | D2 | | | | | | | | | 30 | 30 | 30 | 30 |
| | D3** | | | | | 1:1 | 1:1 | 1:1 | 1:1 | 1:1 | 1:1 | 1:1 | 1:1 |

The figures are given as parts by weight, except that
*component C is reported in % by weight based on the overall composition and
**the amount of component D3 is calculated by means of the ratio of D1 or D2 in accordance with the molar ratio specified.

Assessment of the Bar-Coated Compositions

TABLE 7

Drying time and appearance

| | Drying time [h] | Appearance |
|---|---|---|
| VZ1 | <12 | 2 |
| VZ2 | <24 | 2 |
| VZ3 | <24 | 2 |
| Z1 | <24 | 1 |
| VZ4 | <24 | 2 |
| VZ5 | <24 | 2 |
| VZ6 | <24 | 2 |
| Z2 | <24 | 1 |
| VZ7 | <24 | 2 |
| VZ8 | <24 | 2 |
| VZ9 | <24 | 2 |
| Z3 | <24 | 1 |
| VZ10 | <24 | 2 |
| VZ11 | <24 | 3 |

TABLE 7-continued

Drying time and appearance

| | Drying time [h] | Appearance |
|---|---|---|
| VZ12 | <24 | 3 |
| Z4 | <24 | 1 |
| VZ13 | <24 | 2 |
| VZ14 | <24 | 2 |
| VZ15 | <24 | 2 |
| Z5 | <24 | 1 |
| VZ16 | <24 | 2 |
| VZ17 | <24 | 2 |
| VZ18 | <24 | 2 |
| Z6 | <24 | 1 |
| VZ19 | <24 | 2 |
| VZ20 | <24 | 2 |
| VZ21 | <24 | 2 |
| Z7 | <12 | 1 |
| VZ22 | <12 | 1 |
| VZ23 | <12 | 1 |
| VZ24 | <12 | 2 |
| Z8 | <12 | 1 |
| VZ25 | <12 | 2 |
| VZ26 | <12 | 2 |
| VZ27 | <12 | 1 |
| Z9 | <12 | 1 |
| VZ28 | <48 | 2 |
| VZ29 | <48 | 2 |
| VZ30 | <48 | 2 |
| Z10 | <36 | 1 |
| VZ31 | <48 | 2 |
| VZ32 | <36 | 2 |
| VZ33 | <36 | 2 |
| Z11 | <24 | 1 |
| VZ34 | <36 | 2 |
| VZ35 | <36 | 2 |
| VZ36 | <36 | 2 |
| Z12 | <24 | 1 |

Visual assessment of coating:
1 = very good, uniform application, defect-free, clear;
2 = good, uniform application, largely defect-free, clear or cloudy,
3 = not ok, nonuniform application, many defects Determination of Anti-Fouling Propensity To test the compositions in respect of their efficacy in preventing biofouling, the compositions produced in point 1 were applied to PVC panels analogously to the manner described above and these were transported to the North Sea (Hooksiel/Norderney) for static exposure experiments.

The exposure of the coated PVC test panels (inventive coatings B1-B12, comparative coatings VB1-VB36) having dimensions of 20×40 cm was effected over the period from March to October 2015 at a depth of 20 cm below the water surface. Every 2 months, the test panels were subjected to visual examination and assessed with regard to overgrowth. In addition, a commercial rubber squeegee (rubber window lip) was wiped over a 10 cm strip in the lower region of the test panel without pressure, once from right to left and then from left to right, in order to ascertain the removability of the overgrowth.

The overall assessment was effected by means of a scale as shown below of

TABLE 8

| Coating | 0 months | 2 months | 4 months | 6 months | 8 months |
|---|---|---|---|---|---|
| CE1 | 0 | 2 | 4 | 5 | 5 |
| CE2 | 0 | 2 | 4 | 5 | 5 |
| CE3 | 0 | 2 | 4 | 5 | 5 |
| E1 | 0 | 1 | 1 | 2 | 3 |
| CE4 | 0 | 1 | 3 | 4 | 5 |
| CE5 | 0 | 1 | 2 | 4 | 5 |
| CE6 | 0 | 1 | 2 | 3 | 5 |
| E2 | 0 | 0 | 1 | 1 | 3 |
| CE7 | 0 | 1 | 2 | 4 | 5 |
| CE8 | 0 | 1 | 3 | 4 | 5 |
| CE9 | 0 | 2 | 3 | 3 | 5 |
| E3 | 0 | 0 | 1 | 1 | 3 |
| CE10 | 0 | 1 | 3 | 5 | 5 |
| CE11 | 0 | 2 | 3 | 5 | 5 |
| CE12 | 0 | 1 | 3 | 5 | 5 |
| E4 | 0 | 1 | 1 | 2 | 3 |
| CE13 | 0 | 1 | 3 | 5 | 5 |
| CE14 | 0 | 1 | 2 | 4 | 5 |
| CE15 | 0 | 1 | 2 | 3 | 5 |
| E5 | 0 | 0 | 1 | 1 | 2 |
| CE16 | 0 | 1 | 2 | 4 | 5 |
| CE17 | 0 | 1 | 3 | 4 | 5 |
| CE18 | 0 | 2 | 3 | 3 | 5 |
| E6 | 0 | 0 | 1 | 2 | 2 |
| CE19 | 0 | 2 | 4 | 4 | 5 |
| CE20 | 0 | 2 | 5 | 5 | 5 |
| CE21 | 0 | 2 | 4 | 5 | 5 |
| E7 | 0 | 1 | 1 | 1 | 2 |
| CE22 | 0 | 1 | 3 | 4 | 5 |
| CE23 | 0 | 1 | 2 | 4 | 5 |
| CE24 | 0 | 1 | 2 | 3 | 5 |
| E8 | 0 | 0 | 0 | 0 | 1 |
| CE25 | 0 | 1 | 2 | 4 | 5 |
| CE26 | 0 | 1 | 3 | 4 | 5 |
| CE27 | 0 | 2 | 3 | 3 | 5 |
| E9 | 0 | 0 | 0 | 0 | 1 |
| CE28 | 0 | 2 | 2 | 3 | 4 |
| CE29 | 0 | 2 | 3 | 5 | 5 |
| CE30 | 0 | 2 | 4 | 5 | 5 |
| E10 | 0 | 1 | 1 | 1 | 2 |
| CE31 | 0 | 1 | 2 | 4 | 5 |
| CE32 | 0 | 1 | 2 | 4 | 5 |
| CE33 | 0 | 1 | 2 | 3 | 5 |
| E11 | 0 | 0 | 0 | 1 | 1 |
| CE34 | 0 | 1 | 2 | 4 | 4 |
| CE35 | 0 | 1 | 2 | 3 | 4 |
| CE36 | 0 | 2 | 3 | 3 | 4 |
| E12 | 0 | 0 | 0 | 1 | 1 |

0 = no overgrowth
1 = minimal overgrowth, very easy to remove
2 = slight overgrowth, very easy to remove
3 = moderate overgrowth, distinct residues
4 = severe overgrowth, significant residues
5 = very severe overgrowth, not removable.

The coatings comprising the inventive compositions E1-E12 showed minimal to slight overgrowth after 8 months, which was very easy to remove.

Numerous modifications and variations on the present invention are possible in light of the above teachings. It is therefore to be understood that within the scope of the appended claims, the invention may be practiced otherwise than as specifically described herein.

We claim:

1. A curable composition, comprising:
   a component A: at least one polysiloxane,
   a component B: at least one polyether bearing silyl groups comprising formula (I):

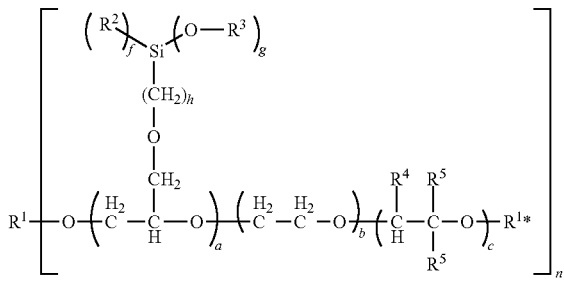
Formula (I)

where
a=1 to 100,
b=1 to 500,
c=0 to 500,
f=0 to 2,
g=1 to 3,
with the proviso that g+f=3,
h=1 to 10,
n=1 to 10,
with the proviso that the fragments having the indices a, b and c are distributed over the molecule chain in a freely permutable manner and that the sum total of a, b and c is >3, and where
$R^1$=a saturated or unsaturated, linear or branched organic hydrocarbyl radical which may contain O, S and/or N as heteroatoms,
$R^{1*}$=hydrogen, a saturated or unsaturated, linear or branched organic hydrocarbyl radical which may contain O, S and/or N as heteroatoms,
$R^2$=independently at each instance an alkyl group having 1 to 8 carbon atoms,
$R^3$=independently at each instance an alkyl group having 1 to 8 carbon atoms,
$R^4$=independently at each instance a hydrogen radical, a linear, branched or cyclic alkyl or chloroalkyl group having 1 to 20 carbon atoms,
$R^5$=independently at each instance a hydrogen radical or a linear, branched or cyclic alkyl or chloroalkyl group having 1 to 20 carbon atoms, an aryl or alkaryl group,
and/or reaction products of a polyether bearing silyl groups of the formula (I) with one or more isocyanate-containing compounds, and a component C: at least one catalyst.

2. The curable composition according to claim 1, wherein the polyether bearing silyl groups has various repeat units that are prepared by reaction of at least one member selected from the group consisting of one or more alkylene oxides, one or more glycidyl ethers, carbon dioxide, one or more cyclic anhydrides, one or more isocyanates, one or more caprolactones, one or more cyclic carbonates, and mixtures thereof.

3. The curable composition according to claim 1, wherein the polysiloxane is a linear or singly or multiply branched Si—OH— or $SiOR^3$-functional polysiloxane.

4. The curable composition according to claim 1, wherein the polysiloxane is an alkoxypolysiloxane.

5. The curable composition according to claim 1, wherein the polysiloxane has at least one member selected from the group consisting of at least one epoxy functionality and at least one alkoxy functionality.

6. The curable composition according to claim 1, further comprising: at least one epoxy-functional compound and at least one amino-functional compound.

7. The curable composition according to claim 6, wherein a stoichiometric ratio of epoxy function to amino function is in the range from 5:0.1 to 0.1:5.

8. The curable composition according to claim 6, wherein the epoxy-functional compound comprises at least one member selected from the group consisting of an epoxy-functional silane, an epoxy-functional siloxane, an aromatic glycidyl ether, an aliphatic glycidyl ether, condensates thereof, and mixtures thereof.

9. The curable composition according to claim 6, wherein the amino-functional compound is an amino-functional alkoxysilane.

10. The curable composition according to claim 1, further comprising:
at least one crosslinker of formula (II)

Formula (II)

with the proviso that 0≤d≤2, 0≤e≤4 and d+e=4,
$R^6$=independently at each instance an alkyl group or cycloalkyl group having 1 to 8 carbon atoms or an aromatic group having 6 to 20 carbon atoms,
$R^7$=independently at each instance an alkyl group having 1 to 8 carbon atoms.

11. The curable composition according to claim 1, wherein the catalyst comprises a catalyst that promotes a hydrolysis condensation mechanism.

12. The curable composition according to claim 1, further comprising:
at least one additive selected from the group consisting of a plasticizer, a filler, an adhesion promoter, a rheology additive, a stabilizer, a catalyst, a solvent, a drying agent, and a chemical moisture drying agent.

13. The curable composition according to claim 1, comprising:
1% by weight to 85% by weight of component A,
1% by weight to 50% by weight of component B,
0.01% by weight to 5% by weight of component C,
based on 100% by weight of the composition.

14. The curable composition according to claim 13, further comprising:
0.1% by weight to 40% by weight of component D, which comprises at least one epoxy-functional compound and at least one amino-functional compound, based on the overall composition.

15. The curable composition according to claim 14, wherein component D comprises 30% by weight to 95% by weight of the epoxy-functional compound and 0.1% by weight to 50% by weight of the amino-functional compound.

16. A coating, a paint, or a dye, comprising the curable composition according to claim 1.

17. A method of reducing biofouling of a surface, the method comprising:
applying the coating, paint, or dye according to claim 16 to the surface.

18. A method of making a coating, a paint, or a dye, the method comprising:
adding the curable composition according to claim 1 to a coating, paint, or dye precursor composition.

* * * * *